(12) United States Patent
Oeckl et al.

(10) Patent No.: US 8,897,534 B2
(45) Date of Patent: Nov. 25, 2014

(54) METHOD AND EVALUATION DEVICE FOR DETERMINING THE POSITION OF A STRUCTURE LOCATED IN AN OBJECT TO BE EXAMINED BY MEANS OF X-RAY COMPUTER TOMOGRAPHY

(75) Inventors: Steven Oeckl, Erlangen (DE); Werner Schön, Erlangen (DE); Holger Schnell, Vaihingen (DE); Gustav Müller, Esslingen (DE); Ioannis Papadopoulos, Winnenden (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 13/882,817

(22) PCT Filed: Oct. 31, 2011

(86) PCT No.: PCT/EP2011/069083
§ 371 (c)(1),
(2), (4) Date: May 1, 2013

(87) PCT Pub. No.: WO2012/059445
PCT Pub. Date: May 10, 2012

(65) Prior Publication Data
US 2013/0223722 A1     Aug. 29, 2013

(30) Foreign Application Priority Data
Nov. 2, 2010   (DE) .......................... 10 2010 043 226

(51) Int. Cl.
*G06K 9/00* (2006.01)
*G06T 7/00* (2006.01)
(52) U.S. Cl.
CPC ..... *G06T 7/0004* (2013.01); *G06T 2207/10081* (2013.01); *G06T 2207/30164* (2013.01); *G06T 2207/20041* (2013.01); *G06T 7/004* (2013.01)

USPC .......................................... 382/132; 382/128
(58) Field of Classification Search
USPC .......................... 382/128, 132, 134, 141, 152
See application file for complete search history.

(56) References Cited

U.S. PATENT DOCUMENTS

2007/0160282 A1    7/2007  Nightingale et al.
2008/0226150 A1*   9/2008  Sadakane ..................... 382/131
(Continued)

OTHER PUBLICATIONS

Holger Schnell, Hochgeschwindigkeits-Computertomografie zur schnellen, zerstörungsfreien und intelligenten Inspektion und Prozessoptimierung von Aluminium-Gussteilen, Dec. 21, 2010, XP55014846, Found on the Internet: URL:http://deposit.ddb.de/cgi-bin/dokserv?idn=101010702x&dok_var=dl&dok_ext=pdf &filename=101010702x.pdf (found on Dec. 14, 2011) Kapitel 5.

(Continued)

*Primary Examiner* — Edward Park
(74) *Attorney, Agent, or Firm* — McGlew and Tuttle, P.C.

(57) ABSTRACT

In a method and an evaluation device for determining the position of a structure located in an object to be investigated by means of X-ray computer tomography, a cutting data record, which images the object in a cutting plane, is determined from a volume data record of the object. The cutting data record is binarized to form a binary data record, in which the structure voxels imaging the structure and the surface voxels imaging an object surface are determined. To determine the position, a distance data record is produced in such a way that a distance value, which characterizes the smallest distance of the respective distance voxel from the surface voxels, is assigned to each distance voxel of the distance data record. The distance voxels corresponding to the structure voxels are then determined and the associated distance values evaluated.

20 Claims, 5 Drawing Sheets

(56) References Cited

U.S. PATENT DOCUMENTS

2009/0074272 A1* 3/2009 Lu et al. .................. 382/128
2010/0303322 A1* 12/2010 Whelan et al. ............ 382/131

OTHER PUBLICATIONS

Werner Schön, Automatische Charakterisierung eines Zylinderkolben-Kühlkanals anhand von 3D-Computertomographie-Daten, May 1, 2008, pp. 1-40, XP55014848, University of Erlangen-Nürnberg, found on the Internet on Dec. 14, 2011: URL: http://www.schoen-werner.de/Studienarbeit/Studienarbeit.pdf.

"Screenshot from Google Scholar", Dec. 14, 2011, XP55014852, found on the Internet on Dec. 14, 2011: URL:http://scholar.google.nl/.

Werner Schön, "Screenshot of Homepage", Apr. 10, 2009, XP55014853, Found on the Internet on Dec. 14, 2011: URL:http://www.schoen-werner.de/zweiteSeite.html.

Lin X et al., Visualisation of Left Ventricular Dysfunction in the Virtual Pathological Heart, Information Visualisation (IV), 2010 14th International Conference, IEEE, Piscataway, NJ, USA, Jul. 26, 2010, pp. 635-640, XP031752360, ISBN: 978-1-4244-7846-0.

Russ John C, Measurement of depletion layer thickness in metal grains, Journal of Computer-Assisted Microscopy, Plenum Press, New York, NY, US, Bd. 3, Nr. 1, Mar. 1, 1991, pp. 7-13, XP009154651, ISSN: 1040-7286.

Zhou et al., Automated segmentations of skin, soft-tissue, and skeleton from torso CT images, Proceedings of SPIE, vol. 5370, 2004, pp. 1634-1639.

Wikipedia: Point in polygon, Revision Sep. 27, 2010.

* cited by examiner

METHOD AND EVALUATION DEVICE FOR DETERMINING THE POSITION OF A STRUCTURE LOCATED IN AN OBJECT TO BE EXAMINED BY MEANS OF X-RAY COMPUTER TOMOGRAPHY

CROSS REFERENCE TO RELATED APPLICATIONS

This application is a U.S. National Phase Application of International Application PCT/EP2011/069083 and claims the benefit of priority under 35 U.S.C. §119 of German Patent Application Ser. No. 10 2010 043 226.1 filed Nov. 2, 2010, the entire contents of which are incorporated herein by reference.

FIELD OF THE INVENTION

The invention relates to a method and an evaluation device for determining the position of a structure located in an object to be investigated by means of X-ray computer tomography.

BACKGROUND OF THE INVENTION

The automatic and destruction-free testing of objects or components by means of X-ray computer tomography is increasingly growing in importance in quality assurance. The challenge is, on the one hand, to reliably recognize material faults, such as, for example, pores or cracks. On the other hand, the dimensional measuring of components is of great importance. This measuring of components to check whether the required manufacturing tolerances are adhered to is, however, difficult. Although, in principle, the distance between two selected points, for example to determine the position of an interior structure in the component, can be determined from the volume data record of the component to be investigated, which is determined by means of X-ray computer tomography, this distance determination is made more difficult by interfering effects, such as, for example, noise, scattered radiation or beam hardening, as these interfering effects change or falsify the grey values of the voxels in the volume data record. Moreover, grey value smears, which make a dimensional measurement of the component more difficult, occur in the transition between two different media, such as, for example, the object material and the air located in an interior cavity.

SUMMARY OF THE INVENTION

The invention is based on an object of providing a simple, precise and automatic method for determining the position of a structure located in an object or component to be investigated by means of X-ray computer tomography.

This object is achieved by a method for determining the position of a structure located in an object to be investigated by means of X-ray computer tomography, comprising the steps:
Providing a volume data record determined by means of X-ray computer tomography of an object to be investigated,
Defining a cutting plane through a structure located in the object and to be determined with respect to its spatial position,
Determining a cutting data record from the volume data record, which images the object in the cutting plane,
Binarizing the cutting data record to form a binary data record,
Determining the structure voxels imaging the structure in the binary data record,
Determining the surface voxels imaging an object surface of the object in the binary data record,
Determining a distance data record in such a way that a distance value, which characterizes the smallest distance of the respective distance voxel from the surface voxels is assigned to each distance voxel of the distance data record,
Determining the distance voxels corresponding to the structure voxels in the distance data record, and
Evaluating the distance values of the distance voxels corresponding to the structure voxels.

A volume data record is firstly reconstructed in the conventional manner from the projection data records determined by means of X-ray computer tomography of the object or component to be investigated. A cutting plane through the structure located in the object and to be determined with respect to its spatial position is then defined. This structure is, for example, a cavity. The cutting plane is, in principle, freely selectable and is produced from the measuring task. A cutting data record, which images the object in the cutting plane, is determined from the volume data record with the aid of the defined cutting plane. In order to easily and precisely be able to determine the position of the structure relative to a surface of the object, the cutting data record is firstly binarized, so a binary data record is produced. To achieve a high degree of precision, the binarization has to take place as precisely as possible, so as far as possible no voxels of the binary data record are incorrectly assigned to the object or not assigned to the object. The binary data record therefore contains voxels with a first binary value, which characterize the object and voxels with a second binary value, which do not characterize the object, in other words the background, artifacts, structures which are not of interest, around the structure to be determined with respect to its position.

The voxels, which exclusively image the structure of interest, are then determined from the voxels of the binary data record having the second binary value. These voxels are called structure voxels. These voxels are, for example determined in such a way that voxels located next to one another, which uniformly have the second binary value, are analyzed with respect to their form, size, position and/or surroundings, so the structure of interest or the corresponding structure voxels can be unambiguously determined. In order to be able to determine the position of the structure of interest relative to the object surface, the voxels imaging the object surface are furthermore determined in the binary data record. These voxels are called surface voxels. The surface voxels are produced in the binary data record from the transition between the voxels having the first binary value, which characterize the object, and the voxels having the second binary value, which do not characterize the object. The voxels located at this transition, which have the first binary value, are the surface voxels.

A distance data record is then determined with the aid of the surface voxels determined. The voxels of the distance data record are called distance voxels. A distance value, which characterizes the smallest distance of the respective distance voxel from the surface voxels, is assigned to each distance voxel. The smallest distance can be calculated according to different metrics, for example by Euclidean metrics or by Manhattan metrics or Cityblock metrics. Distance values, which characterize the smallest distance from the surface voxels in whole voxels, are preferably assigned to the distance voxels.

Proceeding from the distance data record, the spatial position of the structure relative to the object surface can easily be determined in that the distance voxels corresponding to the structure voxels are selected from the distance data record and their distance values evaluated. If the minimum value, for example, is determined from these distance values, this minimum value characterizes the minimum distance of the structure from the object surface. Correspondingly, the maximum value of the distance values characterizes a maximum distance of the structure from the object surface.

The method according to the invention is not based on determining a distance between two selected points or voxels, but determines the spatial position of the structure of interest, for example the minimum distance from the object surface regardless of how the structure is arranged in the object. Since the position of the structure in the object may vary because of manufacturing tolerances, a distance determination of two points or voxels selected statically or manually leads to an imprecise determination of position. In contrast to this, in the method according to the invention a simple, precise and dynamic determination of the position of the structure of interest is made possible by the calculation and evaluation of the distance data record as the method, automatically and independently of position, delivers the desired distance values. The distance values may be converted into a metric longitudinal measurement by offsetting against the known voxel size, so a direct comparison with the construction data is possible to check the adherence of manufacturing tolerances.

A method, in which, before the determination of the distance data record, at least one of the data records is transformed in such a way that at least some of the surface voxels are aligned parallel to a coordinate axis of a Cartesian coordinate system, ensures a simple and precise determination of position, as the distance data record can easily be determined on the basis of the orientation of the surface voxels. Required computing operations may take place in lines and/or columns on the basis of the orientation.

A method according, in which the volume data record is transformed by the following steps:
Binarizing the volume data record to form a binary volume data record,
Defining two intersecting correction cutting planes through the object,
Determining two correction cutting data records from the binary volume data record, which image the object in the respective cutting plane,
Determining two tilt angles from the correction cutting data records, each tilt angle characterizing the position of the surface voxels imaging an object surface relative to a coordinate axis of a Cartesian coordinate system, and
Transforming the volume data record by means of the determined tilt angles in such a way that the surface voxels used to determine the tilt angles run parallel to one of the coordinate axes in each case,
easily allows a position correction of the object relative to the Cartesian evaluation coordinate system. In particular, the correction or transformation of the volume data record allows a position correction of the object relative to the coordinate system in any desired cutting plane. With only one transformation, the object is thus aligned in any desired cutting planes relative to the coordinate system. For position correction, the volume data record is firstly binarized. This takes place, for example, by means of a threshold value binarization, which arranges the voxels of the volume data record in two classes, in that a threshold value, which separates the grey values belonging to the object from the grey values not belonging to the object, is calculated from the distribution function of the grey values belonging to the voxels. The binarization of the volume data record is then carried out by means of the threshold value. To recognize the position of the object relative to the coordinate system, two different correction cutting planes through the object are firstly defined. For these correction cutting planes, the associated binary correction cutting data records, which image the object in the respective cutting plane, are determined from the binary volume data record. A tilt angle, which characterizes the position of the surface voxels imaging the object surface relative to one of the coordinate axes, is determined from each of the correction cutting data records. The surface voxels used for the position correction may differ, depending on the definition of the correction cutting planes, from the surface voxels used to determine the distance data record and are—if a distinction is necessary—also called correction surface voxels. The position of the object relative to the coordinate system is unambiguously determined from the intersection point of the correction cutting planes located on the surface and from the tilt angles. An affine transformation of the volume data record is carried out using the intersection point and the tilt angles and the object imaged by the object voxels is aligned by rotation and translation relative to the coordinate system.

A method, in which the binarization of the cutting data record takes place in such a way that
the edge voxels imaging the edges of the object are determined in the cutting data record,
the number of intersection points of a plurality of differently aligned straight lines through the voxel with the edges is determined with the aid of the edge voxels determined for each voxel in the cutting data record, and
the respective voxel in the binary data record
is assigned to the object, when the majority of the straight lines has an uneven number of intersection points, and
is not assigned to the object when the majority of the straight lines has an even number of intersection points,
allows an extremely precise binarization of the cutting data record. Firstly, the edges of the object are detected and the associated edge voxels determined by means of the Canny algorithm known in digital image processing. Proceeding from the edges determined, the binarization takes place in such a way that a plurality of virtual and differently aligned straight lines are placed through each voxel of the cutting data record and the number of intersection points of the respective straight line with the edges is determined. The respective voxel in the binary data record receives a first binary value characterizing the object when the majority of the straight lines has an uneven number of intersection points with the edges. Accordingly, the respective voxel in the binary data record receives a second binary value not characterizing the object when the majority of straight lines has an even number of intersection points with the edges. An even number also includes zero. This binarization method will also be called a Canny binarization below.

A method, in which the determination of the structure voxels in the binary data record takes place in such a way that
connected voxels with a uniform binary value are in each case assigned to a region,
the regions are evaluated with respect to at least one property, and
one of the regions is classified as the structure with the associated structure voxels, easily ensures the determination of the structure voxels imaging the structure. Firstly, a connection analysis is carried out on the basis of the binary data record, with which connected regions are determined and defined as such. The connected regions are also called binary large objects (blobs). For this purpose, connected or adjacent voxels, which have a uniform binary value, are each assigned to a region and the determined regions and the associated voxels are noted in a list. The determined regions are then evaluated with respect to their properties in order to be able to unambiguously identify the region imaging the structure. Typical properties that can be evaluated are, for example, the form, size, position and/or surroundings of a region. For this purpose, for example, the number of voxels assigned to a region and the height and width of the region are evaluated. Using the evaluated properties, the regions are classified, so the region imaging the structure is unambiguously determined with the associated structure voxels.

A method, in which a structure binary data record is produced, in which the structure voxels have a first binary value and all the further voxels have a second binary value, facilitates the evaluation of the distance data record, as this can easily be offset to determine the position of the structure against the structure binary data record.

A method, in which the determination of the surface voxels in the binary data record takes place in such a way that
 the voxels are run through in one running direction, in particular in rows and/or lines, and
 the voxel is in each case determined as a surface voxel, which is firstly detected during
 the run-through in the running direction as assigned to the object,
allows an easy determination of the surface, relative to which the position of the structure is to be determined. The surface voxels imaging the surface are determined in such a way that the voxels in the binary data record are run through in a respective running direction, in other words in rows or lines depending on the position of the surface to be determined. If, when running through the voxels in the running direction, a voxel is detected for the first time, which is assigned to the object and has the first binary value, this voxel is a surface voxel and is correspondingly noted.

A method, in which a surface binary data record is produced, in which the surface voxels have a first binary value and all the further voxels have a second binary value, simplifies the calculation of the distance data record. Since, in the surface binary data record, exclusively the surface voxels have the first binary value, the starting point for the calculation of the distance data record is easily predetermined.

A method, in which the distance data record is determined proceeding from the surface binary data record, in that therein a distance value is in each case assigned to the voxels provided with the second binary value and the voxels provided with the distance value form the distance voxels, ensures an easy calculation of the distance data record. Proceeding from the surface binary data record, in which exclusively the surface voxels have the first binary value, a distance value, which characterizes the smallest distance of the respective voxel from the surface voxels, can be assigned in each case to all the further voxels. The surface binary data record is gradually converted to the distance data record by this assignment. The distance data record therefore contains the surface voxels, which have a distance value of zero, and the distance voxels, which have respectively assigned distance values. The surface binary data record is therefore converted to the distance data record by means of a distance transformation.

A method, in which the determination of the distance voxels corresponding to the structure voxels takes place by means of the structure binary data record, easily allows the calculation of the distance voxels corresponding to the structure voxels. The structure is clearly punched out by means of the structure binary data record from the distance data record, in that the latter is multiplied by the structure binary data record.

A method, in which the evaluation of the distance values of the distance voxels corresponding to the structure voxels takes place in such a way that an extreme value, in particular a minimum value, is determined, easily ensures the checking of the adherence to manufacturing tolerances. In particular by determining the minimum value, minimum wall thicknesses can, for example, be determined, which are of particular importance for quality assurance.

A method, in which the object has an annular structure, in particular an annular cavity, and to determine the position, a plurality of cutting planes are defined, which, in particular, run through a common axis, and respective cutting data records are determined for the cutting planes and evaluated, allows the checking of annular structures, in particular annular cavities or channels. The determination of the position takes place with the aid of central cuts, in other words cutting planes, which run through a common axis. Thus, at predefined angular distances, the position of the structure in the object can be determined. This can advantageously be applied, for example, in pistons, in particular cylinder pistons, which have an annular cooling channel, the position of which is to be checked.

A method, in which the evaluation of the distance values of the distance voxels corresponding to the structure voxels in the distance data records belonging to the cutting data records takes place in such a way that
 an extreme value, in particular a minimum value, is determined in each case,
 the extreme values are shown as a function of the cutting planes, and
 the extreme values are reworked,
ensures a simple and precise evaluation of the determined extreme values along the annular structure. Since the extreme values are shown as a function of the position of the cutting planes, the position changes can easily be recognized. By reworking the extreme values, measuring errors, in particular, are reduced. The reworking takes place, for example, in such a way that the determined extreme values are smoothed or a continuous curve is approximated on the basis thereof. Furthermore, the metric distance can be calculated from the determined extreme values by means of the known voxel size.

The invention is furthermore based on an object of providing an evaluation device for simple, precise and automatic determination of the position of a structure located in an object to be investigated by means of X-ray computer tomography.

This object is achieved by an evaluation device for determining the position of a structure located in an object to be investigated by means of X-ray computer tomography, which is configured in such a way that
 a volume data record determined by means of X-ray computer tomography of an object to be investigated is providable,
 a cutting plane through a structure located in the object and to be determined with respect to its spatial position is definable,
 a cutting data record is determinable from the volume data record, which images the object in the cutting plane,
 the cutting data record is binarizable to form a binary data record, the structure voxels imaging the structure are determinable in the binary data record, the surface voxels imaging an object surface of the object are determinable in the binary data record, a distance data record is determinable in such a way that a distance value, which characterizes the smallest distance of the respective distance voxel from the surface voxels is assigned to each distance voxel of the distance data record, the distance voxels corresponding to the structure voxels in the distance data record are determinable, and the distance values of the distance voxels corresponding to the structure voxels are evaluatable.

The advantages of the evaluation device according to the invention correspond to the advantages of the method according to the invention already described. In particular, the evaluation device may also be developed in accordance with the method according to the invention.

An X-ray computer tomograph, with an X-ray source for irradiating an object to be investigated from a plurality of projection directions with X-radiation, an X-ray detector to detect the X-radiation, an object carrier for positioning the object between the X-ray source and the X-ray detector, and an evaluation device according to the invention, allows the object to be investigated to be tested immediately after it has been produced, so an inline test can be achieved. A corresponding inline testing system has, for example, a production device and an associated handling apparatus, by means of which the object or component produced is removed from the production device and fed to the X-ray computer tomograph. The X-ray computer tomograph, in a known manner, produces projection data records of the object, from which the volume data record is then reconstructed. The volume data record, which is sub-divided into voxels and has respective associated grey values, is the basis for the method according to the invention. The volume data record is supplied to the evaluation device, which, in the described manner, determines the position of the structure to be tested. By evaluating the determined distance values or extreme values, the decision can then be made as to whether the component corresponds to the quality requirements or not.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
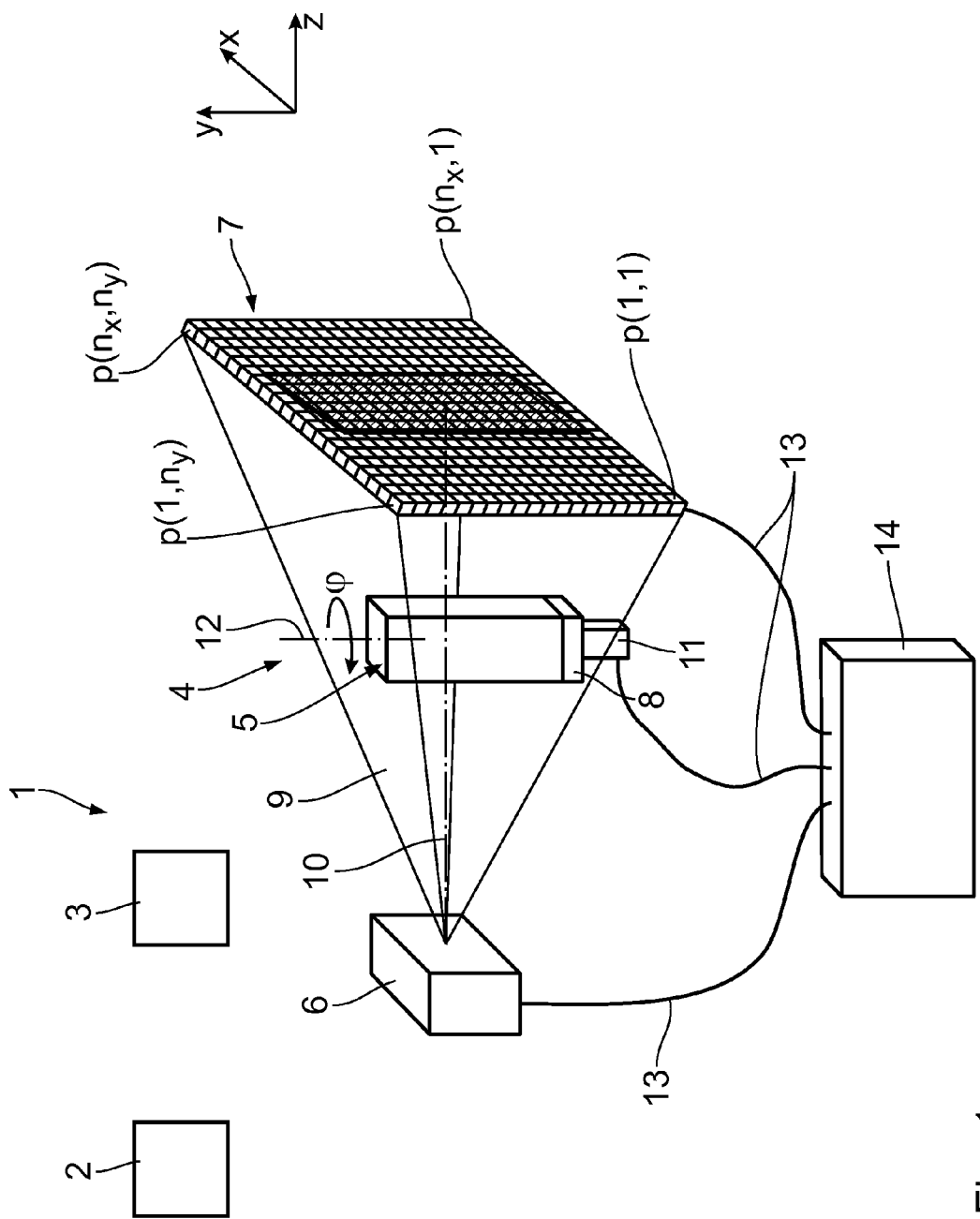
FIG. 1 is a schematic view of an inline test system with an X-ray computer tomograph which has an evaluation device for determining the position of a structure located in an object to be investigated by means of X-ray computer tomography.

An inline test system 1 has a production device 2, a handling apparatus 3 and an X-ray computer tomograph 4. The inline test system 1 is used to test objects 5 or components in the form of pistons directly after they have been produced. The pistons 5 are, for example, cylinder pistons. The pistons 5 produced in the production device 2 can be fed by means of the handling apparatus 3 to the X-ray computer tomograph 4, which carries out a test on the pistons 5 produced.

The X-ray computer tomograph 4 has an X-ray source 6 and an associated X-ray detector 7. Arranged between the X-ray source 6 and the X-ray detector 7 is an object carrier 8, by means of which the pistons 5 to be investigated can be positioned.

The X-ray source 6 is used to produce an X-radiation 9 emitted conically in the direction of the pistons 5. The X-radiation 9 runs substantially symmetrically with respect to a center longitudinal axis 10 of the X-ray computer tomograph 4. The X-ray source 6 is, for example, configured as an X-ray tube or as a linear accelerator, the structure of which is known.

The X-ray detector 7 extends substantially in an x-y-plane, which is defined by an x-direction and a y-direction running perpendicular thereto. The center longitudinal axis 10 defines a z-direction, which runs substantially perpendicular to the x-y-plane. The X-ray detector 7, in the x-direction and y-direction, has a large number of pixels p, which are in detail designated by p (x, y), wherein there applies x=1 to $n_x$ and y=1 to $n_y$. The X-ray detector 7 is, for example, configured as a flat image detector, the structure of which is known.

The object carrier 8 can be rotated by means of an electric drive motor 11 about a rotational axis 12 running parallel to the y-direction. The rotation position of the object carrier 8 and therefore the piston 5 arranged thereon is characterize by a rotation angle $\phi$, which defines a projection direction. The X-ray source 6, the X-ray detector 7 and the drive motor 11 are connected by signal lines 13 to an evaluation device 14. The evaluation device 14 is used, on the one hand, to control the X-ray source 6 and the drive motor 11 and, on the other hand, to evaluate the X-radiation 9 detected by means of the X-ray detector 7.

The piston 5 to be investigated has a piston head 15 and a piston shaft 16 arranged thereon, which are configured substantially symmetrically similarly relative to a central piston axis 17. The piston 5 has an annular carrier 19, which is cast in a groove 18 and generally consists of austenitic cast iron. Configured in the interior of the piston 5 is an interior structure 20 in the form of an annular peripheral cooling channel 20. The cooling channel 20 may be arranged inclined relative to the piston head 15, so its minimum distance $A_B$ relative to the piston head 15 and its minimum distance $A_S$ relative to the piston shaft 16 along the cooling channel 20 generally vary. The X-ray computer tomograph 4 and the associated evaluation device 14 are used to determine the position of the cooling channel 20 in the piston shaft 16, in other words to determine the minimum distances $A_B$ and $A_S$, in particular as a function of their peripheral position or the rotation angle $\phi$.

The testing of the piston 5 will be described below. The piston 5 is removed by means of the handling apparatus 3 from the production device 2 and arranged on the object carrier 8. The piston 5 is irradiated in the conventional manner with X-radiation 9 by means of the X-ray source 6. The X-ray detector 7 detects the X-radiation 9 impinging thereon. For each pixel p (x, y), the detected X-radiation 9 is converted into a corresponding grey value. The corresponding projection data record with the grey values is transmitted to the evaluation device 14 for evaluation. This irradiation process is repeated for a large number of rotation angles φ. A volume data record of the piston 5 is reconstructed from the projection data records with respect to the rotation angles φ by means of the evaluation device 14. The three-dimensional volume data record images the piston 5 and has a large number of volume units designated voxels, which have respective grey values. The volume data record forms the starting point for the position determination of the cooling channel 20.

Figure 2:
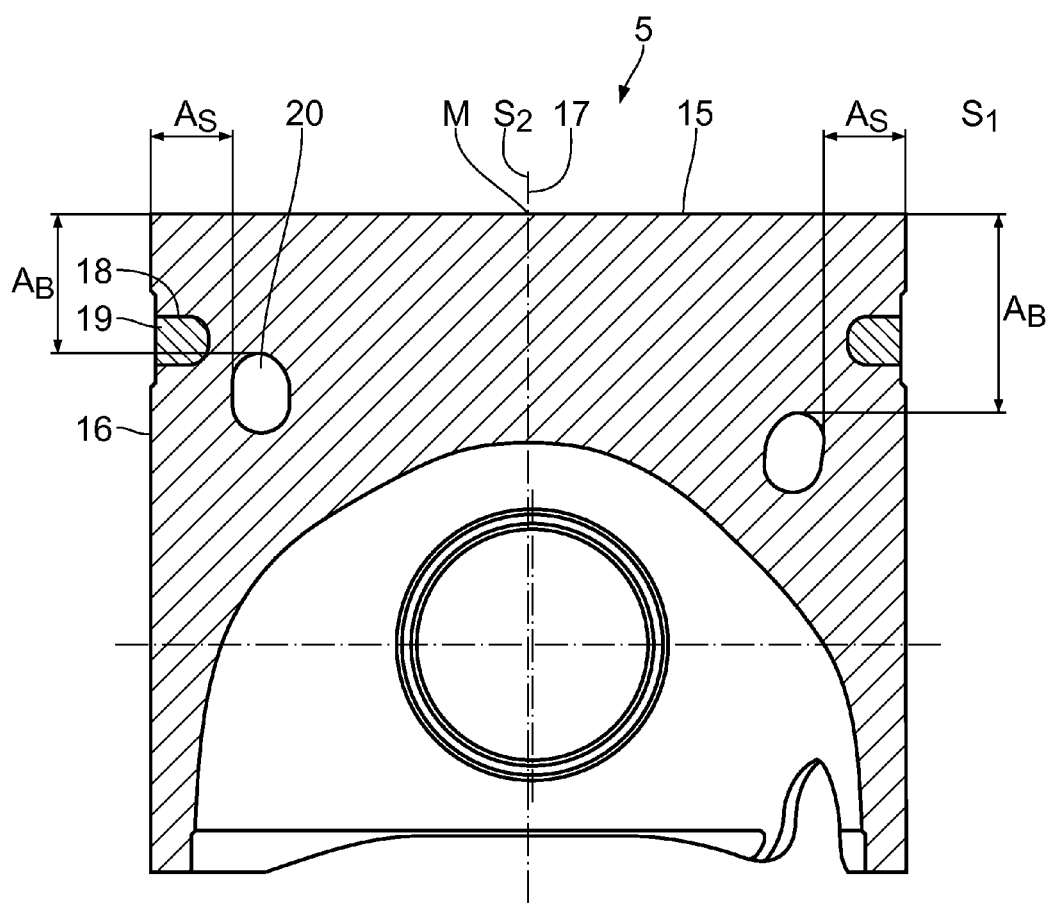
FIG. 2 is a sectional view through an object configured as a piston with a structure configured as a cooling channel along a cutting plane $S_1$.

A position recognition and position correction of the piston 5 firstly takes place relative to a Cartesian evaluation coordinate system K, which is formed by coordinate axes running perpendicular to one another. The coordinate axes will be designated u, v and w below. To correct the position, two correction cutting planes $S_1$ and $S_2$ intersecting in the piston axis 17 are defined. These cutting planes $S_1$ and $S_2$ run perpendicular to one another and are shown in FIG. 2. The volume data record is firstly binarized to form a binary volume data record. This takes place by means of a threshold value binarization, which assigns the voxels of the volume data record to the piston 5 or not to the piston 5. A threshold value, which reliably separates the grey values into these classes, is calculated from the distribution function of all the grey values with respect to the voxels of the volume data record. Two correction cutting data records, which image the piston 5 in the respective cutting plane $S_1$ and $S_2$, are then extracted from the binary volume data record.

Figure 3:
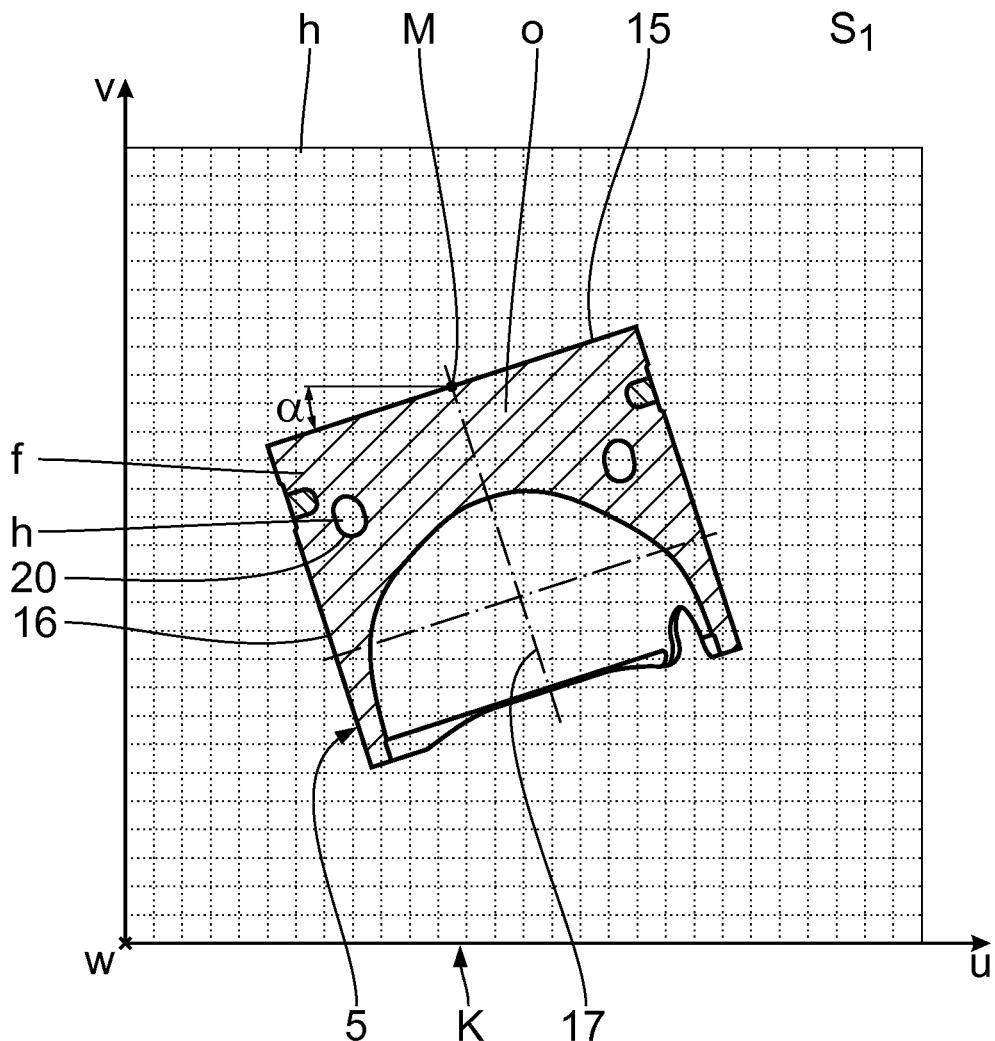
FIG. 3 is a schematic view of a cutting data record of the piston belonging to the cutting plane $S_1$.
Figure 4:
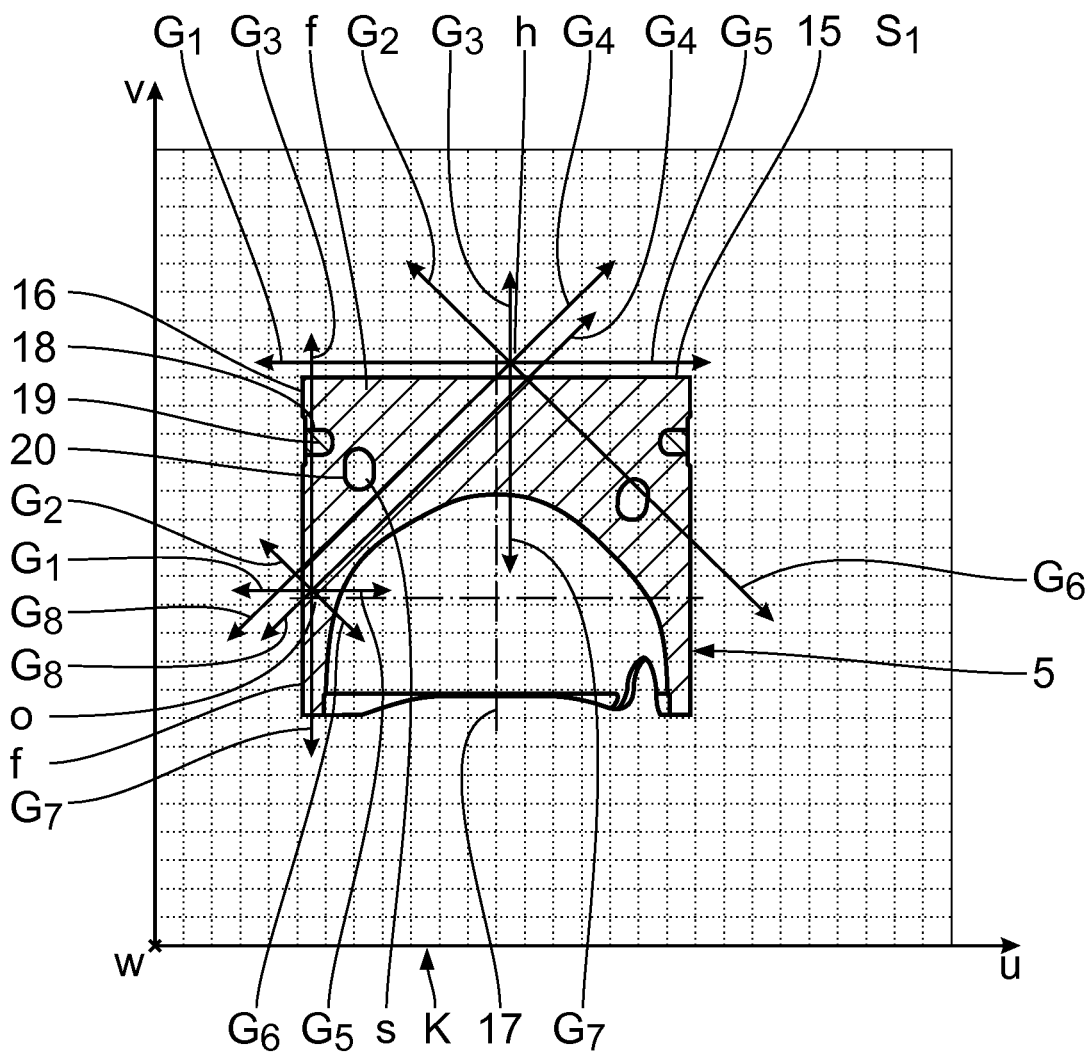
FIG. 4 is a schematic view of the cutting data record belonging to the cutting plane $S_1$ with the piston aligned with respect to an evaluation coordinate system.

FIG. 3 shows the correction cutting data record for the correction cutting plane $S_1$, the piston 5 itself being imaged instead of the voxels imaging the piston 5 for better clarity. The correction cutting data record, for easier illustration, has only a small resolution, i.e. a small number of voxels. In the correction cutting data record, the voxels, which image the piston 5, have a first binary value. These voxels will be called object voxels o below. The voxels not imaging the piston 5, in other words the voxels, which image the background and the cooling channel 20, have a second binary value. These voxels will be called background voxels h below. Moreover, the object voxels o, which characterize the surface of the piston 5, are called surface voxels f. Using the surface voxels f of the piston head 15, a tilt angle α relative to the u-coordinate axis is determined. Accordingly, a tilt angle α relative to the w-coordinate axis is determined in the correction cutting data record for the cutting plane $S_2$. The position of the piston 5 in the Cartesian coordinate system K is unambiguously determined from the tilt angles α and the center point M of the piston head 15. By an affine transformation of the volume data record with the aid of the tilt angles α and the center point M, the volume data record is converted in such a way that the surface voxels f of the piston head 15 run parallel to the u- and w-coordinate axis. The piston 5 or the object voxels o imaging the piston 5 are therefore aligned in the evaluation coordinate system K. This is shown in FIG. 4.

To determine the position of the cooling channel 20, a large number of central cuts are now carried out. For this purpose, cutting planes $S_1$ to $S_n$ are placed at predefined angular distances through the piston axis 17. For example, cutting planes are defined at angular distances of 1°, so 360 cutting planes $S_1$ to $S_{360}$ are produced to test the cooling channel 20. A cutting data record, which images the piston 5 in this cutting plane $S_1$ to $S_n$, is then determined or extracted for each of the cutting planes $S_1$ to $S_n$ from the volume data record converted to correct the position. The cutting data record for the cutting plane $S_1$ is shown in FIG. 4 in accordance with FIG. 3.

Firstly, this cutting data record is binarized into a binary data record. In order to achieve as precise a binarization as possible, the edges of the piston 5 in the cutting data record are firstly determined by means of the known Canny algorithm. The edges are substantially produced from the surface of the piston 5, the iron ring 19 arranged in the groove 18 and the cooling channel 20. The edges of the piston 5 are characterized by edge voxels that are not shown in more detail. A plurality of differently aligned straight lines $G_1$ to $G_8$ are placed through each voxel of the cutting data record and the number of intersection points of the straight lines $G_1$ to $G_8$ with the edges are determined. In FIG. 4 this is illustrated for a background voxel h and an object voxel o with eight straight lines $G_1$ to $G_8$ in each case.

The straight lines $G_1$ to $G_8$ belonging to the background voxel h either have no intersection point or and even number of intersection points with the edges. In comparison to this, the straight lines $G_1$ to $G_8$ belonging to the object voxel o have an uneven number, in each case, of intersection points with the edges. As a result, voxels can be unambiguously assigned to the piston 5 or not assigned to the piston 5. Even faults in the edge course can be compensated, because a decision is made with the aid of the majority of the straight lines $G_1$ to $G_8$. A first binary value is assigned to the object voxels o in the binary data record, whereas a second binary value is assigned to the background voxels h.

The voxels imaging the cooling channel 20 are then determined from the binary data record. These voxels are designated structure voxels s below. For this purpose, a so-called connection analysis is carried out. Connected voxels, which have a uniform binary value, are in each case assigned to a region. These regions are also called binary large objects. The regions and the associated voxels are noted in a list. The regions are then evaluated with respect to their form, size, position and/or surroundings. Typical regions are the piston 5, the cooling channel 20, artifacts because of the iron ring 19 and the background surrounding the piston 5. By evaluating the form, size, position and/or surroundings of these regions, the structure voxels s, which belong to the cooling channel 20, can be determined. To evaluate the regions, for example, only the half of the piston 5 arranged to the left of the piston axis 17 is used, so only one region is determined, which is classified as a cooling channel 20. A structure binary data record is then produced for this region, in which the structure voxels s have a first binary value and all the further voxels have a second binary value.

The surface voxels f for a surface of the piston 5 are then determined from the binary data record. Since the distances $A_B$ and $A_S$ are to be determined, on the one hand, the surface voxels f of the piston head 15 and, on the other hand, the surface voxels f of the piston shaft 16 have to be determined. To determine the surface voxels f of the piston head 15, the binary data record is run through in rows in a respective running direction proceeding from the side opposing the u-coordinate axis. If, in one of the rows that are run through a voxel is determined for the first time, which is an object voxel o and therefore belongs to the piston 5, this object voxel o is simultaneously a surface voxel f. Accordingly, to determine the surface of the piston shaft 16, the binary data record is run through in lines proceeding from the v-coordinate axis. If a voxel is determined for the first time in one of the rows, which is an object voxel o and belongs to the piston 5, this object voxel o is simultaneously a surface voxel f. A surface binary data record is produced for each of the surfaces determined, in which the surface voxels f have a first binary value and all the further voxels have a second binary value.

The determination of the distance $A_S$ will be described below proceeding from the surface binary data record with respect to the piston shaft 16. The distance $A_B$ from the piston head 15 is determined accordingly proceeding from the surface binary data record with respect to the surface voxels f of the piston head 15.

Figure 5:
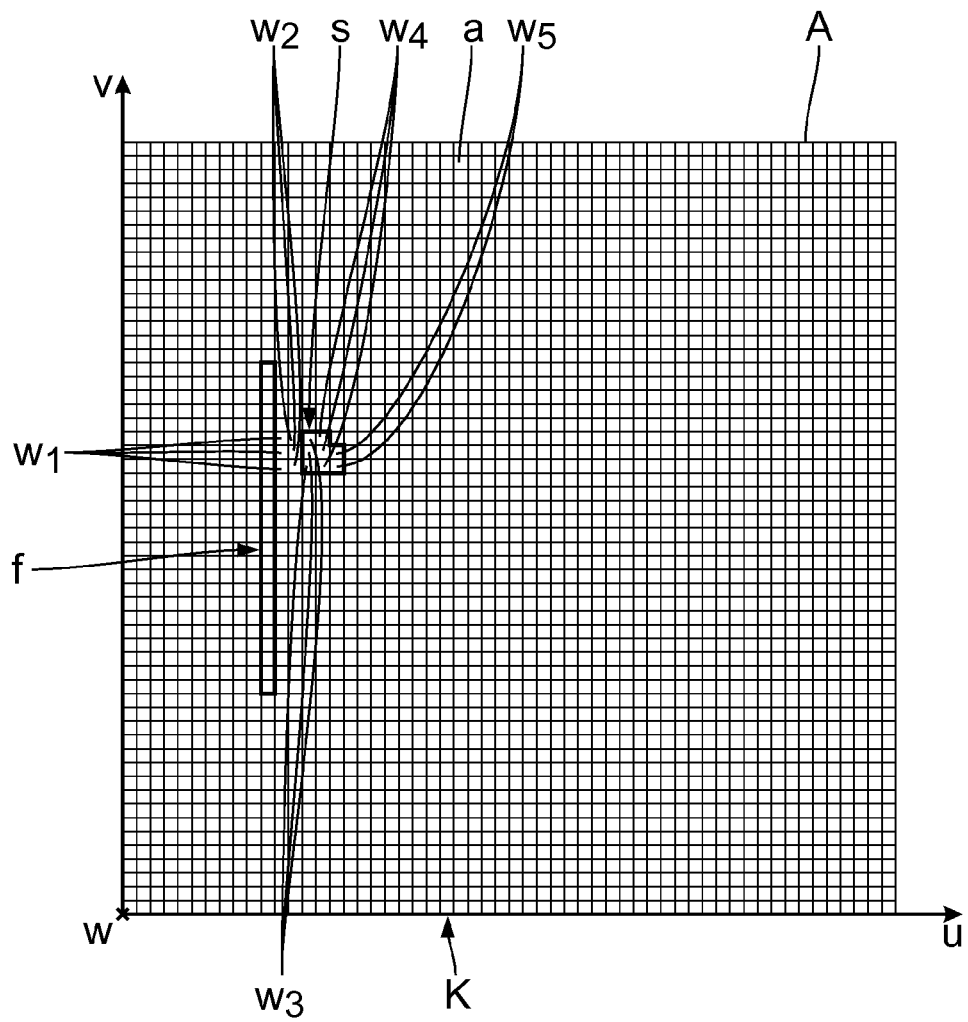
FIG. 5 is a schematic view of a distance data record to determine the position of the cooling channel relative to the surface of the piston.

Proceeding from the surface binary data record, a distance data record A is determined in such a way that a distance value $w_i$ wherein i=1, 2, 3, etc., which characterizes the smallest distance of the respective distance voxel a from the surface voxels f, is assigned to each voxel or each distance voxel a of the distance data record A. This method step is called a distance transformation. The distance values w may, for example, be calculated according to Euclidean metrics or Manhattan or Cityblock metrics. FIG. 5 shows the distance data record A with the surface voxels f of the piston shaft 16 in a higher resolution in comparison to FIGS. 3 and 4. Proceeding from the surface voxels f, the distance voxels a have distance values $w_1$, $w_2$, $w_3$, etc., which describe the distance in whole voxels. The cooling channel 20 is imaged by a structure voxel s, which is also shown in FIG. 5. The position of the structure voxels s is known from the structure binary data record, so the associated distance values $w_3$ to $w_5$ can easily be determined with the aid of the structure binary data record from the distance data record A.

The minimum distance value $w_3$ is a measure of the distance $A_S$ of the cooling channel 20 from the surface of the piston shaft 16. If the distance value $w_3$ is multiplied by the voxel size, the minimum distance $A_S$ is produced in metric units.

The data records shown in FIGS. 3 to 5, for easier illustration, only have a small number of voxels. The precision of the determination of the position is all the greater, the greater the number of voxels of the data records. The cooling channel 20 is then imaged by a large number of structure voxels s, which have different distance values w. The structure voxels s have to be evaluated in the described manner with regard to the associated distance values. To determine the minimum distance $A_S$, the minimum value has to be determined from the distance values w belonging to the structure voxels s.

The described evaluation is carried out for all the cutting planes $S_1$ to $S_n$ and for the distances $A_B$ and $A_S$. If the determined minimum values for the distance $A_B$ or $A_S$ are plotted over all the cutting planes $S_1$ to $S_n$, a curve course is in each case produced, which can still be reworked by mathematical methods. For example, individual values, which are outliers, can be eliminated and/or a continuous curve course approximated by means of the minimum values.

No measurement of the distance between two predefined points or voxels takes place using the method according to the invention and the evaluation device according to the invention. The method according to the invention and the evaluation device according to the invention, simply, precisely and automatically deliver the minimum distance $A_S$ or $A_B$ of the cooling channel 20 from the surface of the piston head 15 or the piston shaft 16 regardless of how the cooling channel 20 is arranged in the piston 5. If a permissible distance is fallen below, the respective piston 5 can be rejected by means of the inline test system 1.

While specific embodiments of the invention have been shown and described in detail to illustrate the application of the principles of the invention, it will be understood that the invention may be embodied otherwise without departing from such principles.

The invention claimed is:

1. A method for determining a position of a structure located in an object to be investigated by means of X-ray computer tomography, the method comprising the steps:
   providing a volume data record determined by means of X-ray computer tomography of an object to be investigated;
   defining a cutting plane through a structure located in the object and to be determined with respect to a spatial position of said structure;
   determining a cutting data record from the volume data record, which images the object in the cutting plane;
   binarizing the cutting data record to form a binary data record;
   determining structure voxels imaging the structure in the binary data record;
   determining surface voxels imaging an object surface of the object in the binary data record;
   determining a distance data record in such a way that a distance value, which characterizes a smallest distance of a respective distance voxel from the surface voxels is assigned to each distance voxel of the distance data record;
   determining the distance voxels corresponding to the structure voxels in the distance data record; and
   evaluating the distance values of the distance voxels corresponding to the structure voxels.

2. A method according to claim 1, wherein before the determination of the distance data record, at least one of the data records is transformed in such a way that at least some of the surface voxels are aligned parallel to a coordinate axis of a Cartesian coordinate system.

3. A method according to claim 1, wherein the volume data record is transformed by the following steps:
   binarizing the volume data record to form a binary volume data record;
   defining two intersecting correction cutting planes through the object;
   determining two correction cutting data records from the binary volume data record, which image the object in the respective cutting plane;
   determining two tilt angles from the correction cutting data records, each tilt angle characterizing a position of the surface voxels imaging an object surface relative to a coordinate axis of a Cartesian coordinate system; and
   transforming the volume data record by means of the determined tilt angles in such a way that the surface voxels used to determine the tilt angles run parallel to one of the coordinate axes in each case.

4. A method according to claim 1, wherein the binarization of the cutting data record takes place in such a way that:
   edge voxels imaging edges of the object are determined in the cutting data record;
   a number of intersection points of a plurality of differently aligned straight lines through the voxel with the edges is determined with the aid of the edge voxels determined for each voxel in the cutting data record; and
   the respective voxel in the binary data record is assigned to the object when a majority of the straight lines has an uneven number of intersection points and the respective voxel in the binary data record is not assigned to the object when the majority of the straight lines has an even number of intersection points.

5. A method according to claim 1, wherein the determination of the structure voxels in the binary data record takes place in such a way that:
   connected voxels with a uniform binary value are in each case assigned to a region;

the regions are evaluated with respect to at least one property; and one of the regions is classified as the structure with the associated structure voxels.

6. A method according to claim 1, wherein a structure binary data record is produced, in which the structure voxels have a first binary value and all the further voxels have a second binary value.

7. A method according to claim 6, wherein the determination of the distance voxels corresponding to the structure voxels takes place by means of the structure binary data record.

8. A method according to claim 1, wherein the determination of the surface voxels in the binary data record takes place in such a way that:
   the voxels are run through in one running direction; and
   the voxel is in each case determined as a surface voxel, which is firstly detected during the run-through in the running direction as assigned to the object.

9. A method according to claim 1, wherein a surface binary data record is produced, in which the surface voxels have a first binary value and all the further voxels have a second binary value.

10. A method according to claim 9, wherein the distance data record is determined proceeding from the surface binary data record, in that therein a distance value is in each case assigned to the voxels provided with the second binary value and the voxels provided with the distance value form the distance voxels.

11. A method according to claim 1, wherein the evaluation of the distance values of the distance voxels corresponding to the structure voxels takes place in such a way that an extreme value is determined.

12. A method according to claim 1, wherein the object has an annular structure and to determine the position, a plurality of cutting planes are defined and respective cutting data records are determined for the cutting planes and evaluated.

13. A method according to claim 12, wherein the evaluation of the distance values of the distance voxels corresponding to the structure voxels in the distance data records belonging to the cutting data records takes place in such a way that:
   an extreme value is determined in each case;
   the extreme values are shown as a function of the cutting planes; and
   the extreme values are reworked.

14. A method according to claim 12, wherein said annular structure is an annular cavity.

15. A method according to claim 12, wherein said cutting planes extend through a common axis.

16. A method according to claim 12, wherein the evaluation of the distance values of the distance voxels corresponding to the structure voxels in the distance data records belonging to the cutting data records takes place in such a way that:
   a minimum value is determined in each case;
   extreme values are shown as a function of the cutting planes; and
   the extreme values are reworked.

17. A method according to claim 1, wherein the determination of the surface voxels in the binary data record takes place in such a way that:
   the voxels are run through in one running direction in one of rows and lines; and
   the voxel is in each case determined as a surface voxel, which is firstly detected during the run-through in the running direction as assigned to the object.

18. A method according to claim 1, wherein the evaluation of the distance values of the distance voxels corresponding to the structure voxels takes place in such a way that a minimum value is determined.

19. An evaluation device for determining a position of a structure located in an object to be investigated by means of X-ray computer tomography, the evaluation device comprising one or more processors being configured in such a way that:
   a volume data record determined by means of X-ray computer tomography of an object to be investigated is providable;
   a cutting plane through a structure located in the object and to be determined with respect to a spatial position of said structure is definable;
   a cutting data record is determinable from the volume data record, which images the object in the cutting plane;
   the cutting data record is binarizable to form a binary data record;
   structure voxels imaging the structure are determinable in the binary data record;
   surface voxels imaging an object surface of the object are determinable in the binary data record;
   a distance data record is determinable in such a way that a distance value, which characterizes a smallest distance of a respective distance voxel from the surface voxels is assigned to each distance voxel of the distance data record;
   the distance voxels corresponding to the structure voxels in the distance data record are determinable; and the distance values of the distance voxels corresponding to the structure voxels are evaluatable.

20. An X-ray computer tomograph, comprising:
   an X-ray source for irradiating an object to be investigated from a plurality of projection directions with X-radiation;
   an X-ray detector to detect the X-radiation;
   an object carrier for positioning the object between the X-ray source and the X-ray detector; and
   an evaluation device comprising one or more processors for determining a position of a structure located in the object to be investigated by means of X-ray computer tomography, which is configured in such a way that:
   a volume data record determined by means of X-ray computer tomography of the object to be investigated is providable;
   a cutting plane through a structure located in the object and to be determined with respect to a spatial position of said structure is definable:
   a cutting data record is determinable from the volume data record, which images the object in the cutting plane;
   the cutting data record is binarizable to form a binary data record;
   structure voxels imaging the structure are determinable in the binary data record;
   surface voxels imaging an object surface of the object are determinable in the binary data record;
   a distance data record is determinable in such a way that a distance value, which characterizes a smallest distance of a respective distance voxel from the surface voxels is assigned to each distance voxel of the distance data record;
   the distance voxels corresponding to the structure voxels in the distance data record are determinable; and
   the distance values of the distance voxels corresponding to the structure voxels are evaluatable.

* * * * *